United States Patent [19]

McKinlay et al.

[11] 4,022,969
[45] May 10, 1977

[54] APPARATUS FOR SIGNALLING THE POSITION OF A POINT ON A SURFACE

[75] Inventors: William Hall McKinlay, Edinburgh; Robert Allan Reid Tait, Linlithgow, both of Scotland

[73] Assignee: Ferranti, Limited, Hollinwood, England

[22] Filed: Sept. 23, 1975

[21] Appl. No.: 616,000

[30] Foreign Application Priority Data

Sept. 27, 1974 United Kingdom ............. 41995/74

[52] U.S. Cl. .............................. 178/18; 340/324 M
[51] Int. Cl.² ........................................ G08C 21/00
[58] Field of Search ...................... 178/18, 19, 20; 340/146.3 MA, 146.3 H, 365 C, 332, 324 M, 365 R, 365 E; 33/1 M

[56] References Cited

UNITED STATES PATENTS

| 3,104,369 | 9/1963 | Rabinow et al. | 340/146.3 MA |
| 3,342,935 | 9/1967 | Leifer et al. | 178/19 |
| 3,665,102 | 5/1972 | Townsend et al. | 178/18 |
| 3,832,693 | 8/1974 | Ishizaki et al. | 178/19 |

Primary Examiner—Thomas A. Robinson
Attorney, Agent, or Firm—Cameron, Kerkam, Sutton, Stowell & Stowell

[57] ABSTRACT

Apparatus for signalling the position of a point on a surface divided into a plurality of identical subsidiary areas includes primary transducer means operable to identify uniquely the subsidiary area in which the point is located, and secondary transducer means representing the sub-divisions of a single subsidiary area. The primary and secondary transducer means may each be represented by a rectangular matrix of light-emitting devices which may be scanned sequentially by scanning means.

15 Claims, 7 Drawing Figures

FIG. 1.

APPARATUS FOR SIGNALLING THE POSITION OF A POINT ON A SURFACE

This Invention relates to apparatus for signalling the position of a point on a surface.

It is frequently necessary to derive from a surface carrying, say, a map or a drawing, some form of signal which represents the position of a selected point on that surface. Such a signal may be applied to a device such as a computer which is to perform operations requiring this information. Similarly, apparatus is used which is able to convert electrical signals into points or lines drawn on a surface. Many forms of such apparatus are known. "Input" apparatus, that is apparatus which derives signals representing the position of a point, exists in the form of automated drawing boards in which movements of a pointer are measured about two perpendicular axes. Similarly cathode-ray tube displays using light pens or similar attachments, and keyboards perform the same function. The majority of these are very complex and hence costly.

"Output" apparatus which draw or otherwise indicate a point on a surface are also well known. The automated drawing board already mentioned will perform this function, as will cathode-ray tube displays and various types of moving-map display. Again, such apparatus is complex and hence expensive.

The complexity is due largely to the need to provide sensing means for determining the position of a point to the required degree of accuracy regardless of its position on the surface. Hence, if the position of a point is required to be determined to an accuracy of, say, 0.1 inch in both X- and Y-coordinates, then different signals must be generated every 0.1 inch right across (i.e., X) and up or down (i.e., Y) the entire surface.

It is an object of the invention to provide apparatus for signalling the position of a point on a surface which is less complex and cheaper than apparatus of the types referred to above.

According to the present invention there is provided apparatus for signalling the position of a point on a surface divided into a plurality of identical subsidiary areas, which includes primary transducer means operable to identify uniquely the subsidiary area in which the point is located, and secondary transducer means representing the sub-divisions of a single subsidiary area to the required degree of accuracy and operable to identify the position of the point within said subsidiary area.

Preferably the primary transducer means takes the form of a matrix of devices each corresponding to a separate one of the subsidiary areas.

Alternatively, the subsidiary areas may be defined in terms of vertical and horizontal coordinates by means of two lines of devices located one along an edge and one along a side of the surface. Preferably one of the lines of devices is carried on a straight-edge movable along and perpendicular to the edge carrying the other line of devices.

An embodiment of the invention will now be described with reference to the accompanying drawings, in which.

Figure 1:
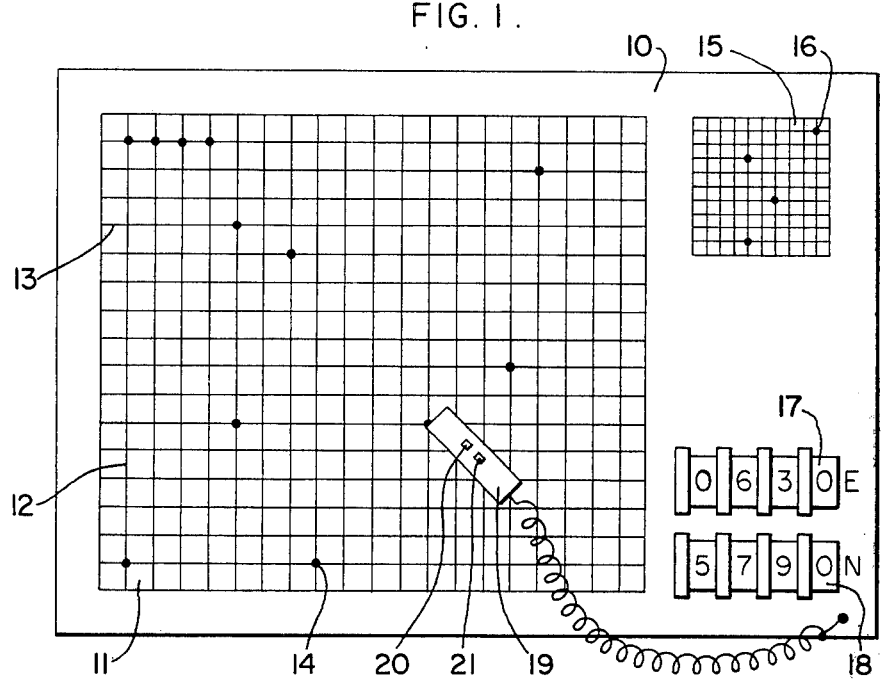
FIG. 1 shows, in schematic form, the layout of a map plotting board.

Referring now to FIG. 1, this shows a rectangular plotting board for use with a map. The board 10 carries a main plotting area 11 arranged to carry a map on its flat surface. The plotting area is covered with a regular grid of wires at a spacing equal to that of the grid into which the map is divided. The wires are arranged horizontally and vertically, that is in columns 12 and rows 13, and at each crossing point a light-emitting device such as a light-emitting diode, is connected between the two wires forming the crossing point. For the sake of clarity only a few of the light-emitting devices 14 are shown. These light-emitting devices form the primary transducer means. The size of the main plotting area 11 is such as to cover the required map area.

To one side of the main plotting area 11 is a subsidiary plotting area 15. This is square and is sub-divided by a grid of wires into 10 equal vertical and horizontal strips. At each crossing point of the wires a light-emitting device 16 is connected between the horizontal and vertical wires forming the crossing point. These light-emitting devices 16 form the secondary transducer means, and only a few are shown in FIG. 1.

Also carried on the plotting board are two switches 17 and 18 used to indicate the registration of the map grid with that on the plotting board, as will be described later. Conveniently these switches may be four-position thumb-wheel switches.

Connected to the plotting board by a flexible cable is a probe 19 which contains a light-sensitive device. The body of the probe 19 carries two switches 20 and 21.

Figure 2:
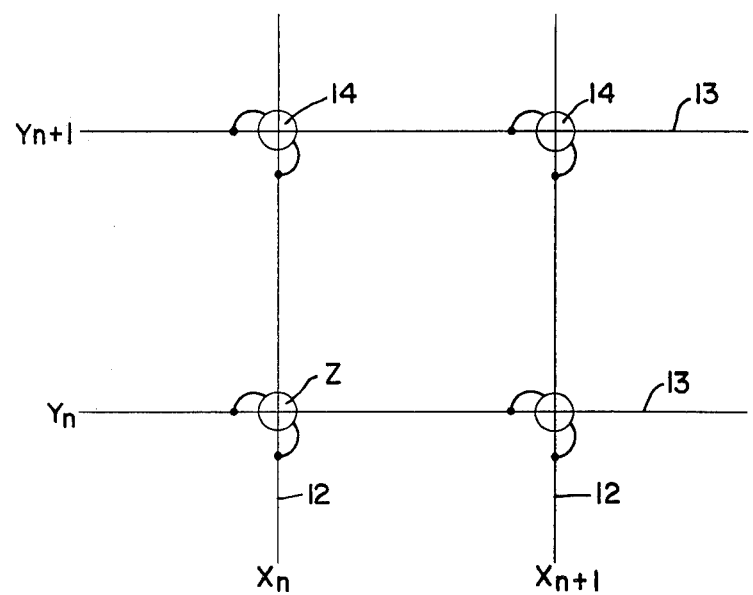
FIG. 2 illustrates the arrangement of primary or secondary transducer means.

FIG. 2 illustrates the arrangement of part of the primary transducer means. Considering the main plotting area, the figure shows two column wires 12 and two row wires 13. At each intersection a light-emitting diode 14 is connected between the appropriate wires. Each column wire 12 represents a value of the X-coordinate, whilst each row wire 13 represents a value of the Y-coordinate. A selected diode is caused to light up by applying the appropriate voltage between the two wires which intersect at that diode. Hence application of the voltage between wires $Xn$ and $Yn$ will cause diode Z to emit light. The arrangement of the secondary transducer means is identical to that just described.

Figure 3:
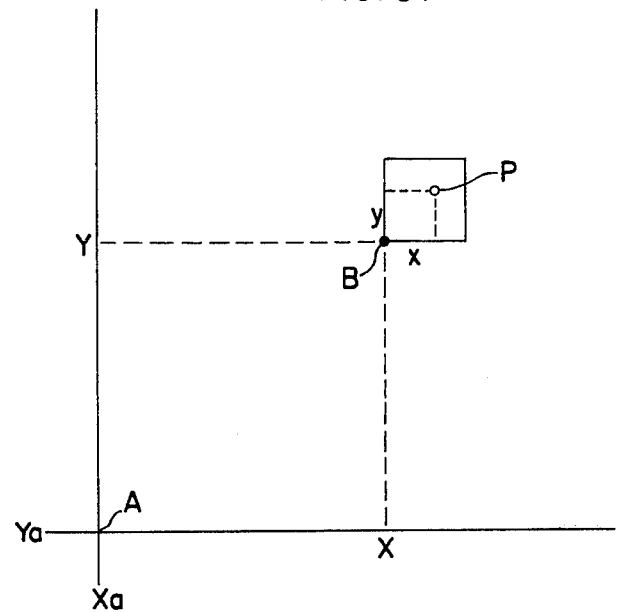
FIG. 3 illustrates the principle of operation of the plotting board of FIG. 2.

FIG. 3 illustrates the principle of operation of the plotting board described above. Point A is the bottom left-hand corner of the main plotting area 11. When a map is placed on the plotting board the grid intersections are aligned, approximately at least, with the points defined by the light-emitting diodes 14. If the map has a scale of 1:50,000, the grid on the map is of 2cm squares, and hence the light-emitting diodes should be arranged in a similarly-spaced matrix. A grid square on such a map is referred to by a standard system of East (i.e., horizontal) and North (i.e., vertical) coordinates. Hence the point A may, for example be indicated uniquely by an eight-figure reference, such as (East) 0652 - (North) 5796. These two four-digit numbers are set on the two thumb-wheel switches 17 and 18 (FIG. 1) and represent the coordinates $Xa$ and $Ya$. A selected grid square on the map itself is indicated uniquely by a single light-emitting diode. Hence the diode located at, or close to, point B is referred to by the coordinates X, Y relative to the point A. The position of a point P within the grid square thus defined is indicated by the sub-divisions of the subsidiary plotting area, which is used to represent the square having point B as its bottom left-hand corner. The location of point P within the square is transferred visually to the subsidiary matrix, where a single light-emitting diode 16 indicates the sub-division of the square by coordinates $x, y$. Hence the absolute position of point P relative to the origin of the entire map series is indicated by the following coordinates:

East : $(Xa + X + x)$
North: $(Ya + Y + y)$

The coordinates $Xa$ and $Ya$ remain fixed whilst any particular section of map remains on the plotting board, whilst the other coordinates are identified by one light-diode in the main plotting area and one on the subsidiary plotting area. It has been found that the necessary visual transfer of the location of a point within a square may be effected to a surprising degree of accuracy.

The apparatus described above may be used as an input device by producing signals which identify, say to a navigation computer, the two light-emitting diodes which define the required point P. Alternatively the apparatus may be used as an output device by causing two selected light-emitting diodes to light up to define a required point.

Figure 4:
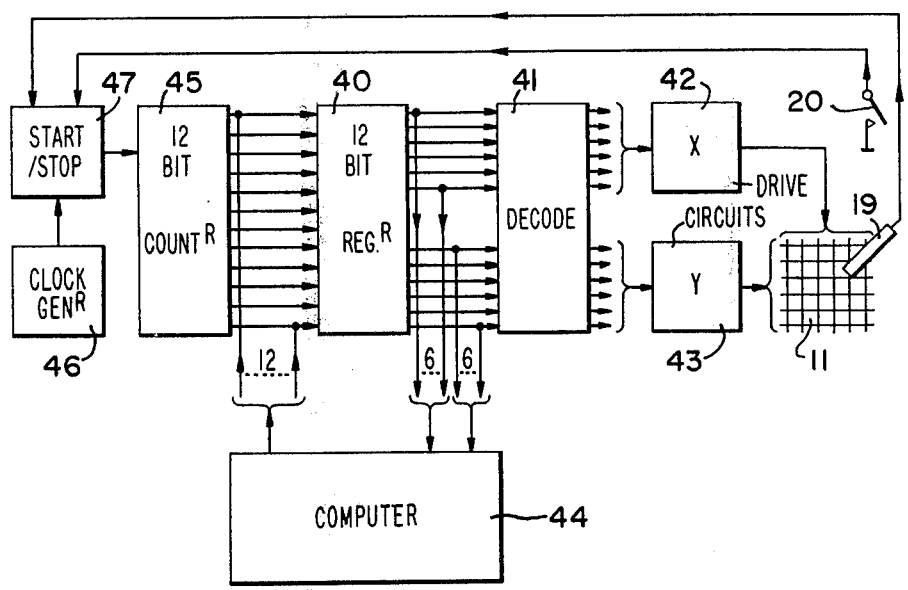
FIG. 4 is a block diagram of circuitry for activating the primary transducer means of FIG. 2.

FIG. 4 illustrates, in block diagram form, the circuitry necessary to enable the apparatus to operate as an input device or an output device. The matrix of light-emitting diodes forming the main plotting area 11 is shown in simplified form. A 12- bit register 40 is provided having a parallel input such that it can store two 6-bit binary numbers representing the X- and Y-coordinates of a light-emitting diode which is to be energized. The output from the register, still in 12-bit parallel form, is applied to a decoder 41. This decodes the two 6-bit binary numbers applied at any particular instant to give two sets of outputs representing the required states of each individual row and column wire connected to the matrix of light-emitting diodes. The capacity of the 12-bit register and decoder is sufficient to control 64 separate row and column wires. The 64 outputs from the decoder representing the column or X-wires are connected via X-drive circuits 42 to the column wires of the matrix. Similarly the 64 outputs from the decoder representing the row or Y-wires are connected via Y-drive circuit 43 to the row wires of the matrix. The two 6-bit numbers applied to the decoder 41 from the register 40 are also applied to the computer 44 controlling the plotting board.

A 12-bit counter 45 is provided and has its 12-bit output applied to the register 40. A clock pulse generator 46 is provided to drive the counter. The probe 19 is connected via a start/stop circuit 47 which controls the operation of the counter 45. The "search" switch 20 carried on the probe 19 is also connected to the start/stop circuit. A 12-bit output from the computer 44 may be applied to the 12-bit input to the register 40.

The operation of the circuit described above will now be described, assuming that it is concerned with the main plotting area only, the light-emitting diodes thus forming the primary transducer means.

For use as an input device, the circuit must be able to identify to the computer the coordinates of one particular selected light-emitting diode. To achieve this, the probe 19 is held against the selected light-diode 14 and the search switch 20 is operated to start a scan of the light-diode matrix. The clock pulse generator 46 causes the counter 45 to count sequentially from the "all-zeros" state to the "all-ones" state. The counter output causes the register to follow the same sequence and apply all the combinations of 6-bit inputs to the decoder 41. The outputs from the decoder thus cause each light-diode to be energised in turn. When the diode adjacent to the probe is energized the light-sensitive device in the probe produces an output which causes the stop/start circuit 47 to stop the scan. The output from the register at the time uniquely identifies the X- and Y-coordinates of the selected light diode on the plotting area, and this information is applied to the computer 44.

For use as an output device all that is necessary is that a single light-emitting diode should be illuminated. This is achieved by a single 12-bit output from the computer 44 to the register 40. This causes the necessary X- and Y-drive circuits to be energized, lighting up the selected light-diode on the plotting area.

Figure 5:
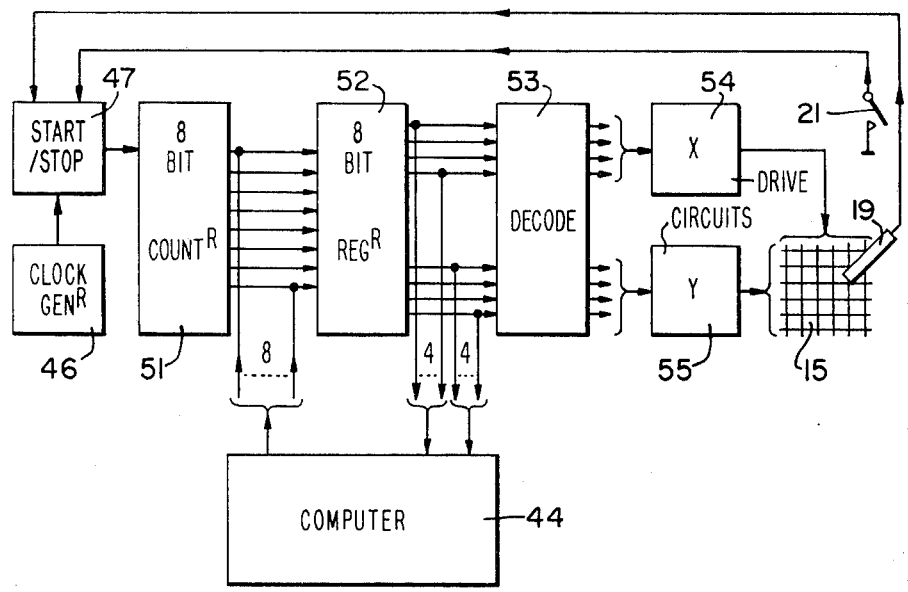
FIG. 5 is a block diagram of circuitry for activating the secondary transducer means.

The circuitry described above is, in fact, almost identical to that required to control the subsidiary plotting area with its secondary transducers, and shown in FIG. 5.

Referring to FIG. 5, it will be seen that the computer 44, clock generator 46, start/stop circuit 47 and probe 19 are common to the primary transducer control circuitry. The control circuit shown comprises an eight-bit counter 51 and an eight-bit register 52. The counter outputs are applied to the register 52, whilst two four-bit outputs from the register 52 are applied to a decoder 53 and to the computer 44. Two four-bit outputs from the decoder 53 are applied to X and Y drive circuits 54 and 55, which control the subsidiary matrix 15. The same probe 19 is used, though a separate search switch 21 is provided.

Figure 6:
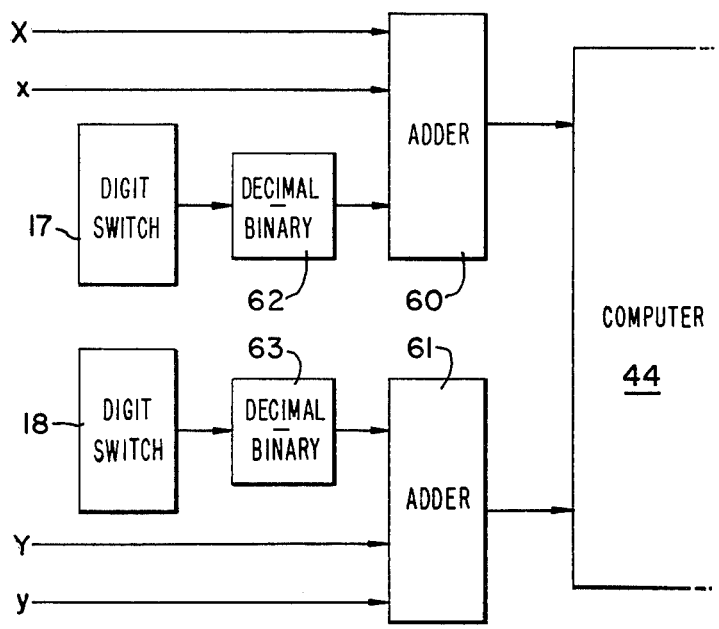
FIG. 6 is a block diagram of additional circuitry.

FIG. 4 shows the 6-bit numbers representing the X- and Y-coordinates of the selected point as being applied directly to the computer 44. However, as already described, there are other/inputs to the computer necessary to identify the absolute coordinates of a selected point. FIG. 6 illustrates the additional circuitry necessary to do this. Two adders 60 and 61 are provided, one for the X-coordinate and one for the Y-coordinate. Signals from the thumb-wheel digit switches 17 and 18 (FIG. 1), representing the values $Xa$ and $Ya$ are applied to the adders via decimal-to-binary converters 62 and 63. Also applied to the X-adder 60 are two parallel binary inputs, one representing the value X and the other representing the value $x$. Similarly, two parallel binary signals are applied to the Y adder 61, representing respectively the coordinates Y and $y$. The outputs from the two adders to the computer 44 represent the absolute coordinates $X_{abs}$ and $Y_{abs}$.

The X- and Y-drive circuits 42 and 43 have not been described, since suitable circuits are well known. In general the requirement is for a switch for each wire which will, when required, change the voltage applied to that wire. For example, when energized an X-drive switch may reduce the voltage on a selected X-wire whilst the associated Y-drive switch increases the voltage on a Y-wire. This produces a potential difference between the wires which lights the light diode connected between the two selected wires. Many other drive arrangements are known and suitable. The light-emitting diode has known and distinctive switch-on and switch-off times, and false operation of the stop/start circuit by the probe output may be prevented by incorporating a trigger circuit responsive to these characteristics.

The embodiment described above has two possible disadvantages. The first is that the map or drawing has to be carried on a sheet of material which is sufficiently translucent to allow the light from the light diodes to be seen by the operator. This may be difficult under high ambient light levels. The second problem is the large number of light diodes required. Even with a 2 cm grid, 300 diodes are necessary to cover an area 30 cm by 40 cm. Both of these problems may be overcome by the embodiment shown in FIG. 7.

Figure 7:
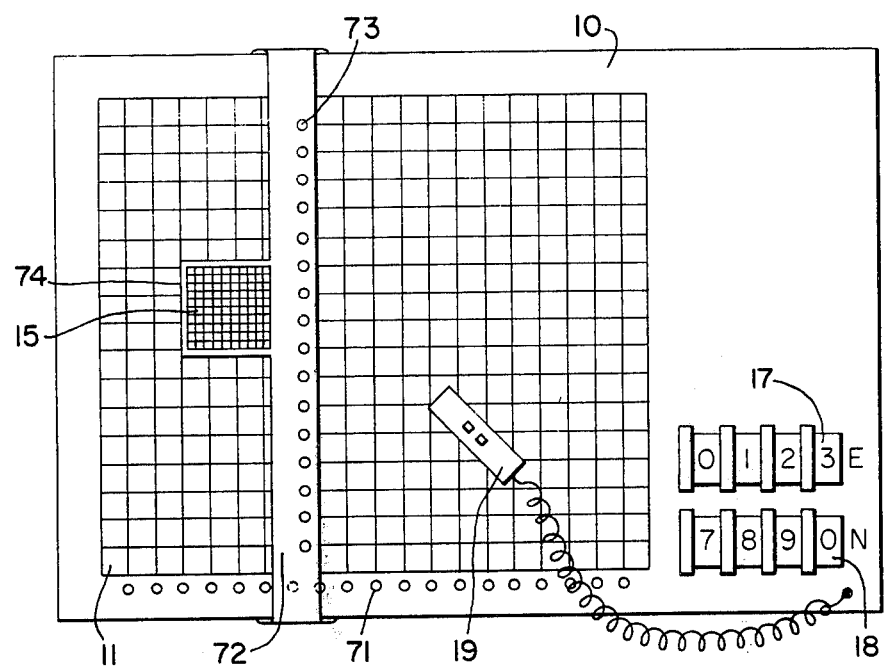
FIG. 7 shows an alternative form of the primary transducer means.

Referring to FIG. 7, it will be seen that, as in the previous embodiment, a plotting board 10 carries a main plotting area 11 for carrying a map or drawing. However, instead of the regular grid of wires and the matrix of light diodes as before, a single row of diodes 71 is arranged along the bottom of the area 11, with the diode spacing equal to the grid spacing required. A vertical straight-edge 72 is provided, and is able to move over the board in a manner well-known with respect to drawing boards. The straight-edge 72 carries a column of light diodes 73, again at the same spacing as the required grid. For convenience, the straight-edge 72 may have an enlargement 74 arranged to carry the subsidiary plotting area 15. This has a 10-by-10 array of light diodes as before. The thumb-wheel switches 17 and 18, and the probe 19 are provided as before.

In operation, the map or drawing is positioned with the ends of the grid lines in alignment, at least approximately, with the row and column of light diodes. To indicate any grid square on the map, the straight-edge 72 is moved across the plotting area until its right-hand edge coincides with the right-hand edge of the grid square. The probe 19 is placed over the appropriate vertical diode 73. When the "start search" switch 20 is operated, the scanning sequence is started. In this embodiment the sequence has to be such that each diode 71 along the bottom edge is energized in turn, with all diodes 73 in the vertical row being energized sequentially for each horizontal diode 71. As in the previous embodiment, the scan will stop when the chosen diode is illuminated. The subsidiary plotting area is used as before.

It will be seen that this embodiment requires only 35 diodes to cover an area 30 cm by 40 cm with a 2 cm grid, compared with the 300 required before. However, against this is the problem of the movable straight edge and the necessary flexible wiring to the diodes which it carries.

If used only as an input device, the horizontal row of diodes 71 is, in fact, unnecessary, so long as the same effective scanning sequence is followed. However, the apparatus will normally be used for both input and output purposes, in which case these diodes are necessary. When used as an output device, two diodes are illuminated, one in the horizontal row and one in the vertical column. These define the two coordinates of the origin of the required grid square.

The only modification necessary to the circuitry of FIG. 4 to operate with this embodiment, is to connect the drive circuits 42 and 43 to the row and column of light diodes, and to arrange each circuit to illuminate a single selected diode.

In the above embodiment, the horizontal row of diodes was arranged along the bottom of the plotting area. It may, of course, be arranged along the top of the area. Alternatively, the vertical row of diodes may be arranged along either side of the plotting area whilst the horizontal row of diodes is carried on a movable horizontal straight-edge. In this latter case the scanning sequence for providing a computer input signal must be changed so that each diode 73 along the side is energized in turn, with all diodes 71 in the horizontal row being energized sequentially for each vertical diode 73.

The above embodiments have been concerned with a computer-controlled plotting board. The board, together with its scanning circuitry may be used in other ways, without the need for a computer. For example, two similar boards may be connected together via a suitable data link to enable an operator in one place to identify a point to an operation at another location. Alternatively, a board may be used to display selected coordinates in digital or other form on a suitable display.

Although light-emitting diodes have been used in the embodiment described above, the primary and secondary transducers may take other forms. In the case of an output device it is almost essential to use transducers which produce a light output, at least on the main plotting area. However, the subsidiary plotting area may be replaced by some form of transducer presenting merely two or more figures representing the required sub-divisions of the desired coordinate. Hence the secondary transducers could be numerical display devices.

For use as an input device only, the primary and secondary transducers could take other forms. The primary transducers and the associated probe may operate, for example, on magnetic, capacitive or inductive principles as are well-known for other types of device. The same principle could be used for the secondary transducers on the subsidiary plotting area. As an alternative, the subsidiary plotting area could be dispensed with, and the secondary transducers could take the form of push-button or other switches. Whatever the form of the secondary transducer means, it may be located remote from the main plotting area.

The switches 17 and 18 used to set the coordinates of the origin A of the main plotting area could be of any desired type. The location of the two search switches 20 and 21 is of little importance; they may for example be mounted on the plotting board. A single switch may be used to start the complete search cycle.

Scale changing to allow the plotting board to be used with maps of different scale is a relatively simple matter so long as the change represents a simple multiple or sub-multiple of the basic grid pattern on the board. Grid patterns other than rectangular or square ones may be provided for special applications.

Although all the above description has related to the use of the plotting board with maps, it will be appreciated that it may be used with drawings or in any other application where information is provided on a surface which may readily be divided up into some form of grid. The apparatus described is simple and cheap in comparison with other apparatus known at present for performing the same function.

What we claim is:
1. Apparatus for signaling the position of a point on a surface, which includes a main plotting area divided into a plurality of identical subsidiary areas, including primary transducer means operable to identify uniquely the subsidiary area in which the point is located, a subsidiary plotting area positioned at one side of said main plotting area representing to a larger scale a subsidiary area divided into a plurality of identical sub-divisions, and secondary transducer means operable to identify uniquely the sub-division of the subsidiary area in which the point is located.

2. Apparatus as claimed in claim 1 in which the primary transducer means comprise a plurality of primary transducers arranged in a rectangular matrix such that each primary transducer identifies a separate subsidiary area.

3. Apparatus as claimed in claim 2 in which the rectangular matrix is defined by rows and columns of conductors, a separate primary transducer being connected to a row conductor and a column conductor at each intersection.

4. Apparatus as claimed in claim 1 in which the primary transducer means comprise a single row and a single column of primary transducers arranged such that the combination of one row transducer and one column transducer uniquely identifies a subsidiary area.

5. Apparatus as claimed in claim 4 in which the rows and columns of primary transducers are arranged respectively parallel to the upper and lower edges and to the sides of the surface.

6. Apparatus as claimed in claim 5 in which the row of primary transducers is movable across the surface.

7. Apparatus as claimed in claim 6 in which the subsidiary plotting area is movable across the surface of the main plotting area.

8. Apparatus as claimed in claim 1 which includes scanning means operable to energize the primary transducers in a predetermined sequence such that each subsidiary area is identified in turn.

9. Apparatus as claimed in claim 8 which includes a probe movable to any subsidiary area and arranged to inhibit the operation of the scanning means when the primary transducer identifying that subsidiary area is energized.

10. Apparatus as claimed in claim 1 in which the primary transducers are light-emitting devices.

11. Apparatus as claimed in claim 1 in which the secondary transducer means comprise a plurality of transducers arranged in rectangular matrix such that each transducer identifies a separate sub-division of the subsidiary area.

12. Apparatus as claimed in claim 11 in which the rectangular matrix is defined in rows and columns of conductors, a separate secondary transducer being connected to a row conductor and a column conductor at each intersection.

13. Apparatus as claimed in claim 11 which includes scanning means operable to energize the secondary transducers in a predetermined sequence such that each sub-division of the subsidiary area is identified in turn.

14. Apparatus as claimed in claim 11 in which the secondary transducers are light-emitting devices.

15. Apparatus as claimed in claim 1 which includes switch means for identifying the origin of the surface relative to a datum.

* * * * *